US 12,051,175 B2

United States Patent
Petrangeli et al.

(10) Patent No.: US 12,051,175 B2
(45) Date of Patent: Jul. 30, 2024

(54) VIEW SYNTHESIS WITH SPATIAL AND ROTATIONAL CONSISTENCY

(71) Applicant: ADOBE INC., San Jose, CA (US)

(72) Inventors: Stefano Petrangeli, Mountain View, CA (US); Viswanathan Swaminathan, Saratoga, CA (US); Haoliang Wang, San Carlos, CA (US); YoungJoong Kwon, Chapel Hill, NC (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/097,600

(22) Filed: Nov. 13, 2020

(65) Prior Publication Data

US 2022/0156886 A1 May 19, 2022

(51) Int. Cl.
*G06N 3/08* (2023.01)
*G06N 3/045* (2023.01)
*G06T 3/604* (2024.01)
*G06T 3/606* (2024.01)

(52) U.S. Cl.
CPC ............ *G06T 3/604* (2013.01); *G06N 3/045* (2023.01); *G06N 3/08* (2013.01); *G06T 3/606* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2019/0108651 A1* | 4/2019 | Gu | ........................ | G06V 10/955 |
| 2019/0147642 A1* | 5/2019 | Cole | ...................... | G06V 10/82 |
| | | | | 345/419 |
| 2020/0342570 A1* | 10/2020 | Yuan | ...................... | G06T 3/0093 |
| 2021/0012093 A1* | 1/2021 | Rao | .......................... | G06T 9/002 |
| 2021/0034921 A1* | 2/2021 | Pinkovich | ................ | G06F 7/58 |
| 2021/0158510 A1* | 5/2021 | Huang | ................... | G16H 50/30 |
| 2021/0211593 A1* | 7/2021 | Overbeck | ............. | G06T 15/205 |
| 2021/0248811 A1* | 8/2021 | Shan | ........................ | G06N 3/08 |

OTHER PUBLICATIONS

"MIXAMO", Adobe, Retrieved from Internet URL : https://www.mixamo.com, accessed on Feb. 17, 2021, pp. 7.

(Continued)

*Primary Examiner* — Aaron M Richer
(74) *Attorney, Agent, or Firm* — Shook, Hardy & Bacon L.L.P.

(57) ABSTRACT

Methods, system, and computer storage media are provided for novel view synthesis. An input image depicting an object is received and utilized to generate, via a neural network, a target view image. In exemplary aspects, additional view images are also generated within the same pass of the neural network. A loss is determined based on the target view image and additional view images and is used to modify the neural network to reduce errors. In some aspects, a rotated view image is generated by warping a ground truth image from an initial angle to a rotated view angle that matches a view angle of an image synthesized via the neural network, such as a target view image. The rotated view image and the synthesized image matching the rotated view angle (e.g., a target view image) are utilized to compute a rotational loss.

20 Claims, 9 Drawing Sheets

(56) References Cited

OTHER PUBLICATIONS

Ali Eslami, S. M., et al., "Neural scene representation and rendering", Science, vol. 360, No. 6394, pp. 1204-1210 (2018).
Chang, A. X., et al., "Shapenet: An information-Rich 3D Model Repository", Graphics, arXiv:1512.03012, pp. 1-11 (2015).
Choy, C. B., et al., "3D-R2N2: A Unified Approach for Single and Multi-view 3D Object Reconstruction", In European conference on computer vision (ECCV), pp. 628-644 (2016).
Girdhar, R., et al., "Learning a Predictable and Generative Vector Representation for Objects", In European Conference on Computer Vision (ECCV), pp. 484-499 (2016).
Ionescu, C., et al., "Human3.6M: Large Scale Datasets and Predictive Methods for 3D Human Sensing in Natural Environments", IEEE Transactions on Pattern Analysis and Machine Intelligence, vol. 36, No. 7, pp. 1325-1339 (Jul. 2014).
Ilg, E., et al., "FlowNet 2.0: Evolution of Optical Flow Estimation with Deep Networks", Computer Vision and Pattern Recognition (CVPR), pp. 2462-2470 (2017).
Jaderberg, M., et al., "Spatial Transformer Networks", In Advances in neural information processing systems, pp. 1-14 (2015).
Kar, A., et al., "Learning a Multi-View Stereo Machine", In Advances in neural information processing systems, pp. 1-13 (2017).
Kwon, Y., et al., "Rotationally-Temporally Consistent Novel View Synthesis of Human Performance Video", In Proceedings of the European Conference on Computer Vision (ECCV), pp. 1-17 (2020).
Lai, W-S., et al., "Learning Blind Video Temporal Consistency", European Conference on Computer Vision (ECCV), pp. 1-16 (2018).
Lombardi, S., et al., "Neural Volumes: Learning Dynamic Renderable Volumes from Images", ACM Trans. Graph., vol. 38, No. 4, Article 65, arXiv:1906.07751, p. 65:1-65:14 (2019).
Mathews, J., "An Update on Adobe Fuse as Adobe Moves to the Future of 3D & AR Development", Retrieved from Internet URL : https://www.adobe.com/products/fuse.html, accessed on Feb. 17, 2021, pp. 2 (Sep. 2019).
Olszewski, K., et al., "Transformable Bottleneck Networks", In The IEEE International Conference on Computer Vision (ICCV), pp. 7648-7657 (2019).
Park, E., et al., "Transformation-Grounded Image Generation Network for Novel 3D View Synthesis", In Proceedings of the IEEE conference on computer vision and pattern recognition, pp. 3500-3509 (2017).
Paszke, A., et al., "Automatic differentiation in PyTorch", 31st Conference on Neural Information Processing Systems, pp. 1-4 (2017).
Park, J. J., et al., "DeepSDF: Learning Continuous Signed Distance Functions for Shape Representation", IEEE, arXiv:1901.05103, pp. 165-174 (2019).
Pumarola, A., et al., "3DPeople: Modeling the Geometry of Dressed Humans", IEEE, arXiv:1904.04571, pp. 2242-2251 (2019).
Ridgeway, K., et al., "Learning To Generate Images With Perceptual Similarity Metrics", ICLR, arXiv:1511.06409, pp. 1-12 (2015).
Rezende, D. J., et al., "Unsupervised Learning of 3D Structure from Images", In Advances in Neural Information Processing Systems, pp. 1-17 (2016).
Sun, S-H., et al., "Multi-view to Novel view: Synthesizing novel views with Self-Learned Confidence", In Proceedings of the European Conference on Computer Vision (ECCV), pp. 1-17 (2018).
Saito, S., et al., "PIFu: Pixel-Aligned Implicit Function for High-Resolution Clothed Human Digitization", arXiv:1905.05172, pp. 1-15 (2019).
Shysheya, A., et al., "Textured Neural Avatars", In Proceedings of the IEEE Conference on Computer Vision and Pattern Recognition, pp. 2387-2397 (2019).
Sitzmann, V., et al., "DeepVoxels: Learning Persistent 3D Feature Embeddings", In Proceedings of the IEEE Conference on Computer Vision and Pattern Recognition, pp. 2437-2446 (2019).
Sitzmann, V., et al., "Scene Representation Networks: Continuous 3D-Structure-Aware Neural Scene Representations", 33rd Conference on Neural Information Processing Systems, pp. 1-12 (2019).
Tatarchenko, M., et al., "Single-view to Multi-view: Reconstructing Unseen Views with a Convolutional Network", arXiv:1511.06702, pp. 1-9 (2015).
Tulsiani, S., et al., "Multi-view Supervision for Single-view Reconstruction via Differentiable Ray Consistency", In Proceedings of the IEEE conference on computer vision and pattern recognition, pp. 2626-2634 (2017).
Varol, G., et al., "Learning from Synthetic Humans", In Proceedings of the IEEE Conference on Computer Vision and Pattern Recognition, pp. 109-117 (2017).
Wang, Z., et al., "Image Quality Assessment: From Error Visibility to Structural Similarity", IEEE Transactions on Image Processing, vol. 13, No. 4, pp. 600-612 (Apr. 2004).
Wu, J., et al., "Learning a Probabilistic Latent Space of Object Shapes via 3D Generative-Adversarial Modeling", NIPS'16: Proceedings of the 30th International Conference on Neural Information Processing Systems, pp. 82-90 (2016).
Wu, J., et al., "MarrNet: 3D Shape Reconstruction via 2.5D Sketches", 31st Conference on Neural Information Processing Systems, pp. 1-11 (2017).
Yang, J., et al., "Weakly-supervised Disentangling with Recurrent Transformations for 3D View Synthesis", In Advances in Neural Information Processing Systems, pp. 1-9 (2015).
Yan, X., et al., "Perspective Transformer Nets: Learning Single-View 3D Object Reconstruction without 3D Supervision", 30th Conference on Neural Information Processing Systems, pp. 1-15 (2016).
Zhou, T., et al., "View Synthesis by Appearance Flow", In European conference on computer vision, pp. 286-301 (2016).
Zhu, H., et al., "View Extrapolation of Human Body from a Single Image", In Proceedings of the IEEE Conference on Computer Vision and Pattern Recognition, pp. 4450-4459 (2018).

* cited by examiner

VIEW SYNTHESIS WITH SPATIAL AND ROTATIONAL CONSISTENCY

BACKGROUND

Novel view synthesis aims to create new views of an object given known viewpoints. Novel view synthesis is often used to create content for immersive applications, such as virtual reality and/or augmented reality applications, where objects are often explored from many different angles. Novel view synthesis is also utilized in other contexts including but not limited to telepresence, volumetric video reconstruction, and virtual try-on systems. Existing technology for novel view synthesis has limitations, however. First, the existing methods focus on inanimate objects, such as cars and chairs, that tend to have simple and symmetric forms. As such, these existing methods are unable to accurately synthesize new views with fine-grained details and asymmetric shapes. This limitation is particularly problematic when modeling humans because the shapes and stances are often asymmetric and they have a lot of fine-grained details, such as hair, fingers, glasses etc. Additionally, these existing methods treat each generated view independently, which results in visual inconsistency across different adjacent views of the same object. Again, visual consistency is particularly important to accurately model humans, who are more susceptible to deformation than static objects.

SUMMARY

Embodiments of the present disclosure are directed towards synthesizing novel views of an object, such as a human, with spatially-consistent and rotationally-consistent results. A set of input images depicting an object at input view angles is received and used to generate, via a neural network system, a target view of the object at a target view angle. In some embodiments, the set of input images comprises two images, three images, or four images, where each input image depicts the object at a different input view angle. In exemplary embodiments, a volumetric representation of the object is generated for the target view image based on the set of input images, and the target view image is generated from the volumetric representation.

In exemplary embodiments, one or more additional view images depicting the object at additional view angles are generated via the neural network system. Additional view images are generated in the same pass through the neural network system as the main target view image such that the combination of the additional view images and the target view image can provide feedback to the neural network system during training. In some embodiments, the additional view images include two adjacent view images captured at adjacent view angles and two distant view images captured at distant view angles that are farther from the target view angle than the adjacent view angles. Each of these additional view images are compared to ground truth images at the additional view angles to compute a multi-view supervision loss. This multi-view supervision loss is combined with a base loss that is based on a comparison of the target view image with a ground truth image at the target view angle, and the total loss is used to modify the neural network system.

In addition to or alternatively to generating additional view images, some embodiments of the disclosure include generating rotated view images by warping ground truth images at initial angles to depict the object at a rotated view angle, where the rotated view angle matches a view angle of an image created via the neural network system, such as a target view image. Where additional view images are also generated, the rotated view angle may match an additional view angle. Embodiments utilize the rotated ground-truth view image and the synthesized image matching the rotated view angle (i.e., a target view image or additional view image) to compute a rotational loss. The rotational loss is combined with the base loss and, in some embodiments, with a multi-view supervision loss, to determine a total loss, which is used to train the neural network system.

This Summary is provided to introduce a selection of concepts in a simplified form that are further described below in the Detailed Description. This Summary is not intended to identify key features or essential features of the claimed object matter, nor is it intended to be used as an aid in determining the scope of the claimed object matter.

DETAILED DESCRIPTION

Figure 1:
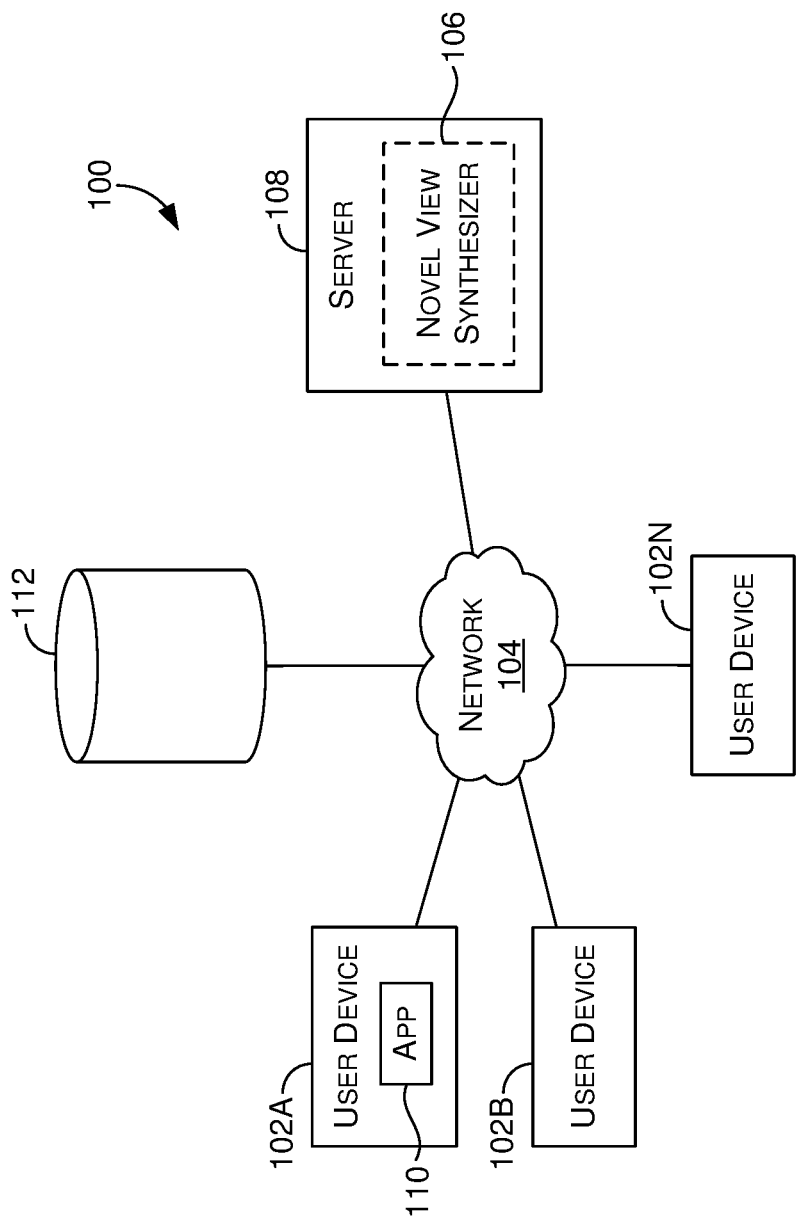
FIG. 1 depicts an example configuration of an operating environment in which implementations of the present disclosure can be employed.

The object matter of the present invention is described with specificity herein to meet statutory requirements. However, the description itself is not intended to limit the scope of this patent. Rather, the inventors have contemplated that the claimed object matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present disclosure are directed towards synthesizing novel views of an object from input images of the object. Novel view synthesis is often used to create content for immersive applications, such as virtual reality and/or augmented reality applications, where objects are often explored from many different angles while capturing views from a sufficient number of angles would be burdensome. As such, novel view synthesis creates new views of the object based on a limited number of known views. Novel view synthesis is also utilized in other contexts including but not limited to telepresence, volumetric video reconstruction, and virtual try-on systems. Existing technology for novel view synthesis, however, has limitations. First, the existing methods focus on inanimate objects, such as cars and chairs, that tend to have simple and symmetric forms. As such, these existing methods are unable to accurately synthesize new views with fine-grained details and asymmetric shapes. This limitation is particularly problematic when modeling humans because the shapes and stances are often asymmetric and they have a lot of fine-grained details, such as hair, fingers, glasses etc. Additionally, these existing methods treat each generated view independently, which results in visual inconsistency across different adjacent views of the same object. Again, visual consistency is particularly important to accurately model humans, who are more susceptible to deformation than static objects. Without visual consistency, portions of objects in the synthesized views may disappear, move, and/or reappear, resulting in an unrealistic and aesthetically distracting effect.

Accordingly, embodiments of the present disclosure are directed to facilitating novel view synthesis that produces spatially-consistent and rotationally-consistent results, which is particularly advantageous in the case of human subjects. At a high level, a neural network system is trained to perform novel view synthesis by generating multiple views that provide information about spatial and rotational relationships between different views of an object. Based on this information, the neural network system is trained to preserve fined-grained details and consistency when performing novel view synthesis even with asymmetrical objects.

A set of input images depicting an object at known view angles, which are referred to as input view angles, are received and used to generate, via a neural network system, a target view of the object at a new view angle, which is referred to as the target view angle. In some embodiments, the set of input images comprises a plurality of images, such as two images, three images, or four images, where each input image depicts the object at a different input view angle. In exemplary embodiments, a volumetric representation of the object is generated for the target view image based on the set of input images, and the target view image is generated from the volumetric representation.

In exemplary embodiments, in addition to the target view image, one or more other images at different view angles are created utilizing the neural network system. These other images, referred to herein as additional view images, are generated in a similar manner as the target view image, and are generated within the same pass through the neural network as the target view image. The term "multi-view supervision" is used herein to refer to the generation of one or more additional views, using the neural network, in addition to a desired target view during training. In some embodiments, the additional view images include two adjacent view images captured at adjacent view angles and two distant view images captured at distant view angles that are farther from the target view angle than the adjacent view angles. Each of these additional view images are compared to ground truth images at the additional view angles to compute a multi-view supervision loss. This multi-view supervision loss is combined with a base loss that is based on a comparison of the target view image with a ground truth image at the target view angle. These losses are combined to determine a total loss, which is fed back into neural network system and used to modify the system to reduce loss.

In addition to or alternatively to multi-view supervision, some embodiments of the disclosure include generating other views by creating rotated views of ground truth images for comparison to views synthesized by the neural network system. In particular, a rotated view image is generated by warping a ground truth image at an initial angle to a rotated view angle, where the rotated view angle matches a view angle of a synthesized image, such as a target view angle. Where multi-view supervision is also employed, the rotated view angle may match an additional view angle of one of the additional view images. In exemplary embodiments, multiple rotated view images are created by warping ground truth images at different initial view angles to the target view angle and/or additional view angles. The rotated view image represents an expected view of the object at the rotated view angle (i.e., a target or additional view angle) when the object is rotated from another view. In this way, the rotated view image provides information on rotational consistency between different views. Embodiments utilize the rotated view image and the synthesized image matching the rotated view angle (i.e., a target view image or additional view image) to compute a rotational loss. The rotational loss is combined with a base loss and, in some embodiments, a multi-view supervision loss, to determine a total loss, which is used to train the neural network system.

Utilizing multi-view supervision and rotational loss, the neural network system is trained to perform novel view synthesis with rotational and spatial consistency. The resulting novel views synthesized by the trained network retain fine-grained details for complex and asymmetric shapes, including for human subjects.

FIG. 1 depicts an example configuration of an environment in which some implementations of the present disclosure can be employed for novel view synthesis. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that environment 100 shown in FIG. 1 is an example of one suitable operating environment. Among other components not shown, environment 100 includes a number of user devices, such as user devices 102*a* and 102*b* through 102*n*, network 104, database 112, and server(s) 108. Each of the components shown in FIG. 1 may be implemented via any type of computing device, such as one or more of computing device 1000 described in connection to FIG. 10, for example. These components may communicate with each other via network 104, which may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within environment 100 within the scope of the present disclosure. Each may comprise a single device or multiple devices cooperating in a distributed environment.

User devices 102a through 102n may be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a camera, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device with a built-in camera or capable of being connected to a camera.

User devices 102a through 102n may include one or more processors and one or more computer-storage media. The computer-storage media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

Application 110 may generally be any application capable of facilitating the exchange of information between user devices 102a through 102n and the server(s) 108 in carrying out steps for novel view synthesis, including training a neural network to perform novel view synthesis. In some implementations, application 110 comprises a web application that can run in a web browser and could be hosted at least partially on the server-side of environment 100. In addition, or instead, application 110 comprise a dedicated application, such as an application having image processing functionalities, including but not limited to functionalities for 3D design, reconstruction, augmented reality, and/or virtual reality. In one example, application 110 is an application that provides for digital 3D design, such as the Adobe® Dimension®. Additionally or alternatively, an example embodiment of application 110 is an application for designing immersive augmented reality experiences, such as Adobe Aero™ In some cases, application 110 is integrated into the operating system (e.g., as a service). It is, therefore, contemplated herein that "application" be interpreted broadly.

In accordance with embodiments herein, the application 110 is configured to facilitate synthesizing a new view of a digital object based on one or more known views. In particular, a user can select or input an image of a known view of an object. An image can be selected or input in any manner. For example, a user may take a picture using a camera on a device, for example, user device 102a. As another example, a user may select a desired image from a repository, for example, stored in a data store accessible by a network, such as database 112, or stored locally at the user device 102a.

As described herein, embodiments of server 108 also facilitate synthesizing a new view of a digital object via novel view synthesizer 106. Server 108 includes one or more processors, and one or more computer-storage media. The computer-storage media includes computer-readable instructions executable by the one or more processors. The instructions may optionally implement one or more components of novel view synthesizer 106, described in additional detail below. Novel view synthesizer 106 trains and operates a neural network system to perform novel view synthesis. The neural network system trained and operated by the novel view synthesizer 106 may be comprised of one or more neural networks trained to generate designated output.

At a high level, novel view synthesizer 106 trains a neural network system to create an image of an object that is depicted at a different viewing angle than an input image. The input image depicts the object from an input view angle, and novel view synthesizer 106 outputs an image of the object from a target view angle based on a determined volumetric representation of the object in the input image. In exemplary embodiments, novel view synthesizer 106 utilizes multiple input images of the same object at different input view angles to generate the target view.

Prior to synthesizing unknown new views, the neural network system is trained using training data. In exemplary embodiments, training data includes sets of training images, where each set comprises images of an object from known viewing angles. From a set of training images, a target view image is generated, where the target view depicts the object within the input set of training images but at a different viewing angle. In exemplary aspects, training the neural network system is based on one or more loss functions that considers other generated views. For instance, in some embodiments, training the neural network system includes multi-view supervision in which multiple images are generated within the same pass of the neural network system and differences between the generated images and the ground truth images for those viewing angles are computed for refining the neural network system. Alternatively or in addition, training the neural network system includes computing a rotational consistency loss by warping a ground truth image into a new, rotated view and comparing the rotated view to a synthesized image with the same view as the rotated view angle to refine the neural network system.

For cloud-based implementations, the instructions on server 108 may implement one or more components of novel view synthesizer 106, and application 110 may be utilized by a user to interface with the functionality implemented on server(s) 108. In some cases, application 110 comprises a web browser. In other cases, server 108 may not be required. For example, the components of novel view synthesizer 106 may be implemented completely on a user device, such as user device 102a. In this case, novel view synthesizer 106 may be embodied at least partially by the instructions corresponding to application 110 and may be provided as an add-on or plug-in to application 110. Thus, it should be appreciated that novel view synthesizer 106 may be provided via multiple devices arranged in a distributed environment that collectively provide the functionality described herein. Additionally, other components not shown may also be included within the distributed environment. In addition, or alternatively, novel view synthesizer 106 may be integrated, at least partially, into a user device, such as user device 102a. Furthermore, novel view synthesizer 106 may at least partially be embodied as a cloud computing service.

Environment 100 of FIG. 1 further may include database 112, which may store computer instructions (e.g., software program instructions, routines, or services), data, and/or models used in embodiments described herein. In some implementations, database 112 stores information or data received via the various components of novel view synthesizer 106 and provides the various components with access to that information or data as needed. Although depicted as a single component, database 112 may be embodied as one or more data stores. Further, the information in database 112 may be distributed in any suitable manner across one or more data stores for storage (which may be hosted externally or internally).

Figure 2:
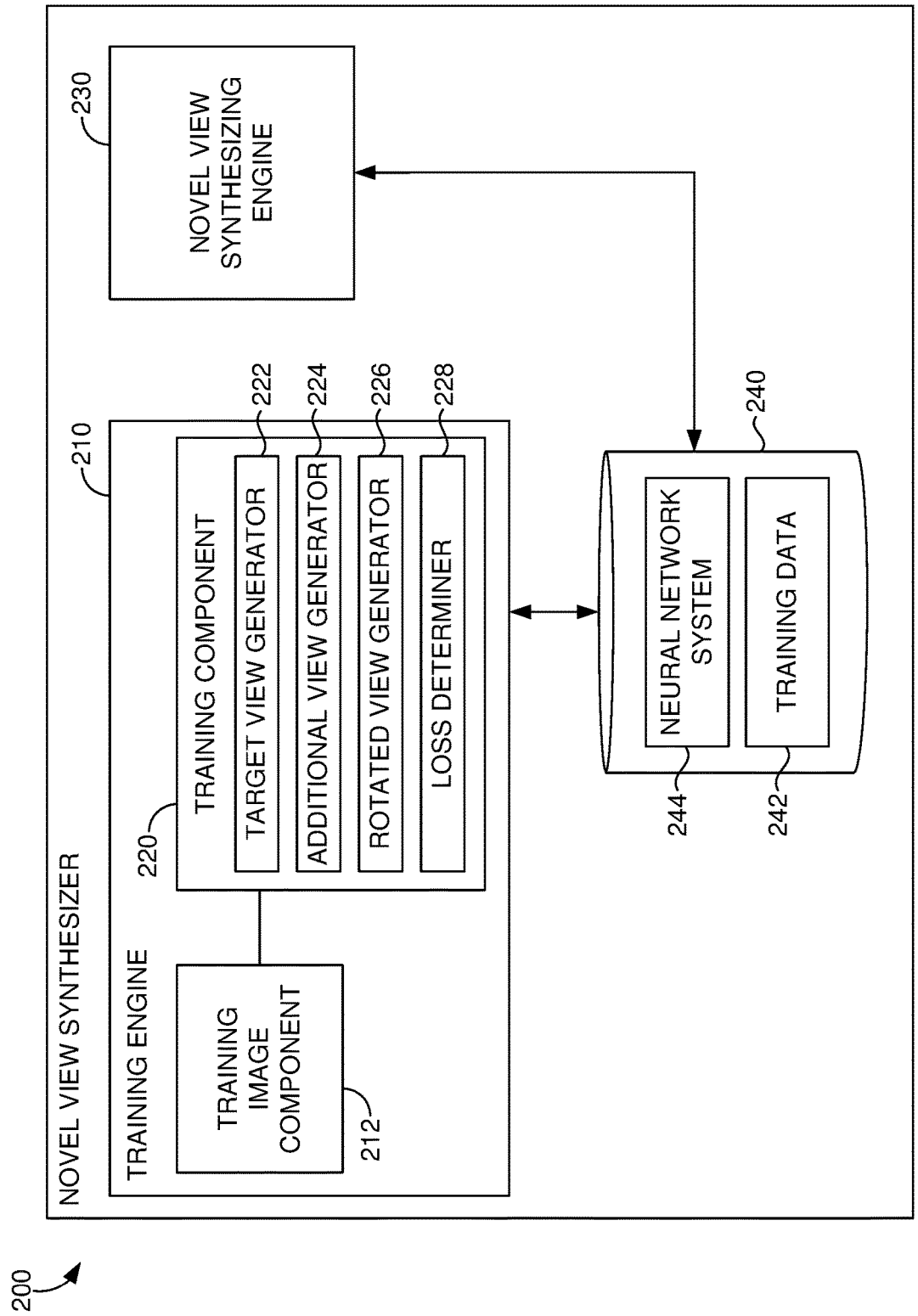
FIG. 2 depicts aspects of an example novel view synthesizer, in accordance with various embodiments of the present disclosure.

Referring to FIG. 2, aspects of an illustrative novel view synthesizer 200 are shown, in accordance with various embodiments of the present disclosure. Novel view synthesizer 200 includes training engine 210, novel view synthesizing engine 230, and data store 240. The foregoing components of novel view synthesizer 200 can be implemented, for example, in operating environment 100 of FIG. 1. In particular, those components may be integrated into any suitable combination of user devices 102a and 102b through 102n, and server(s) 208, including as novel view synthesizer 106 of FIG. 1.

Data store 240 is used to store computer instructions (e.g., software program instructions, routines, or services), data, and/or models used in embodiments described herein. In some implementations, data store 240 stores information or data received via the various components of novel view synthesizer 200 and provides the various components with access to that information or data, as needed. Although depicted as a single component, data store 240 may be embodied as one or more data stores. Further, the information in data store 240 may be distributed in any suitable manner across one or more data stores for storage (which may be hosted externally).

In embodiments, data stored in data store 240 includes training data 242. Training data generally refers to data used to train a neural network, or portion thereof. As such, training data 242 includes training images, including training input images and training target view images. Some embodiments of training data 242 further include training occlusion masks as described herein. Some embodiments of training data 242 further include warping functions for rotating a ground truth image from one view angle to another view angle and warping occlusions masks indicating which pixels present in one view are present in a rotated view. In some cases, data can be received by novel view synthesizer 200 from user devices (e.g., an input image received by user device 102a or another device associated with a user, via, application 110). In other cases, data can be received from one or more data stores in the cloud. Data store 240 can also be used to store the neural network system 244.

Training engine 210 is responsible for training neural network system 244 to synthesize novel views of objects from one or more input images of the objects at different views As depicted in FIG. 2, training engine 210 includes a training image component 212 and a training component 220. Although these components are illustrated separately, it can be appreciated that the functionality described in association therewith can be performed by any number of components.

Training image component 212 provides training images that are to be fed into the neural network system 244 for training purposes. The training input images comprise sets of input images, where each image in a set depicts an object from a different view. In exemplary embodiments, the object depicted in each set of training input images is a human subject. In some embodiments, the sets of training input images within the training data include human subjects in different poses, having different physical characteristics (including but not limited to body shape, skin tone, hair geometry, and fine-grained details), and having a variety of clothing (including but not limited to types of garments, types of accessories, colors, and textures).

In exemplary embodiments, the views depicted in each set are based on pre-determined intervals. The pre-determined intervals may be measured as azimuth and/or elevation. For instance, in one embodiment, each set of training images includes images depicting an object at 18 azimuth angles that are each separated by 20 degrees and 3 elevations each separated by 10 degrees. The training images may be utilized as training input images, ground truth (reference) images, or both. For instance, in one training pass through the neural network, an image with a target view of 60 degrees is generated such that the training image for 60 degrees is utilized as a ground truth image for determining loss; however, in another pass, the training image of 60 degrees may be utilized as an input image to synthesize a new image at a different angle.

In exemplary embodiments, each training image is an RGB image. In some embodiments, training image component 212 is configured to create an occlusion mask for each RGB training image. Occlusion masks, which may also be referred to as binary segmentation masks, indicate which pixels within an image represent foreground and which pixels represent background. An occlusion mask may be stored in association with the RGB training image that matches the same view angle.

Some embodiments of training image component 212 are configured to create synthetic images to be used as training images. For example, in one embodiment, training image component 212 creates training images from a set of different motion capture (Mocap) sequences that portray different types of motions, which may range from relatively static and every day motions (e.g., answering a phone, clapping) to very complex and dynamic motion patterns (e.g., dancing, fighting). Implementations of training image component 212 utilizes 3D rendering techniques to apply the Mocap animation sequences to a set of 3D human models. As mentioned, embodiments of the 3D human models have diverse physical characteristics and clothing. In some embodiments, illumination in the form of ambient light and a directional light source are applied to the 3D models. Utilizing a projective camera, a predetermined set of views are captured of each combination of 3D model and Mocap sequence. The captured views are stored as RGB images and labeled with the appropriate view angle. In exemplary embodiments, training image component 212 also creates an occlusion mask for each RGB training image that is also labeled with the appropriate view angle.

Training component 220 uses input images and, in some embodiments, occlusion masks from training image component 212 for training the neural network system 244. In exemplary embodiments, from at least one input image, the neural network system 244 generates an intermediate volumetric representation of the object within the training image and, based on the intermediate volumetric representation, generates a new image of the object from a target view angle that is different from the view angle of the input image. In exemplary embodiment, the newly generated image is an RGB image. In some embodiments, an occlusion mask is also generated for each generated RGB image. Output of neural network system 244 is compared to ground truth data, such as a ground truth image and ground truth occlusion mask for the target view angle. Generally, the comparisons to ground truth data indicate errors (or losses), which are used to adjust the neural network system 244 to avoid similar errors in future iterations.

To improve consistency between multiple views of the same object, training component 220 generates multiple views from a set of input images and compute different types of losses to train neural network system 244. Exemplary embodiments of training component 220 generates multiple views from the same input views within the same pass through neural network system 244 and compare these additional views to ground truth data to compute a loss for training neural network system 244. Additionally or alternatively, training component 220 generates a rotated view image by warping a ground truth image and compares the rotated view image to an image synthesized the neural network system 24 to compute a loss. As such, embodiments, of training component 220 includes target view generator 222, additional view generator 224, and rotated view generator 226. Additionally, training component 220 includes loss determiner 228 that computes a loss used for training neural network system 244.

Target view generator 222 is generally responsible for creating, from one or more input images of an object, a new image of the object depicted from the target view angle. The target view angle is different from the view angle of the input images such that it may be considered an unknown view. For example, if a first input image is a view at 30 degrees and a second input image is a view from 270 degrees, the target view angle may be 90 degrees. In some aspects, the target view angle is input by a user. In other aspects, the target view angle is determined automatically based on a training schedule.

Target view generator 222 creates a target view image from a set of input images where the set is made of one or more input images. In some embodiments, only two input images are utilized. In other embodiments, three input images are utilized. In further embodiments, four input images are utilized. It is contemplated that the number of input images may be more (e.g., five or more) or less (e.g., one) in other embodiments.

Figure 5:
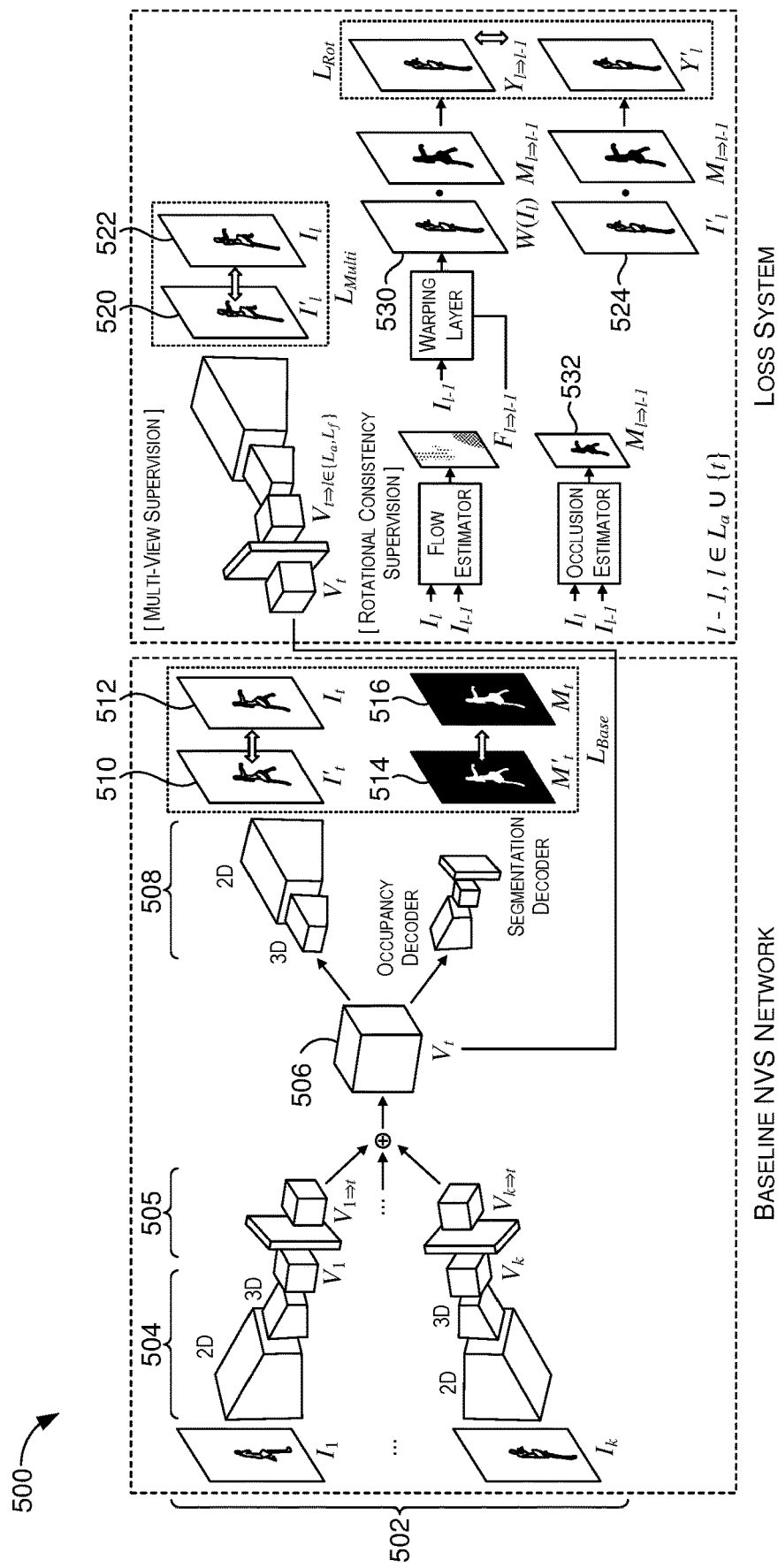
FIG. 5 illustrates an example architecture for a novel view synthesis system utilizing multi-view supervision and rotational loss, in accordance with embodiments of the present disclosure.

From the set of input images, target view generator 222 generates the target view image utilizing a neural network system, such as neural network system 244. Neural network system 244 includes one or more neural networks. In exemplary aspects, neural network system 244 comprises a convolutional neural network (CNN). An example architecture of one embodiment of neural network system 244 is depicted in FIG. 5.

In exemplary embodiments, an intermediate volumetric representation of the object in the input images is generated, and the target view image is synthesized based on the intermediate volumetric representation. The intermediate volumetric representation is a latent representation of the object in the form of a condensed vectorization of the object. In exemplary embodiments, the intermediate volumetric representation is generated for a particular view angle such that an image of a target view angle will be synthesized from a volumetric representation for the target view angle. In other embodiments, target view generator 222 generates the target view image from the input image without creating a latent volumetric representation. For example, some embodiments of target view generator 222 generate the target view image by moving or regressing pixels from the input images, while another embodiment generates the target view image by regressing texture coordinates corresponding to a pre-defined texture map. Further, some alternative embodiments of the disclosure generate the target view image by generating an explicit occupancy volume from an input image.

In exemplary embodiments, target view generator 222 outputs an RGB image of the target view. In some embodiments, target view generator 222 also outputs an occlusion mask corresponding to the target view. As used herein, an occlusion mask is a binary segmentation mask that indicates foreground pixels and background pixels. As the object in the image is the foreground, the occlusion mask identifies which pixels represent the object, such as a human subject.

Additional view generator 224 is generally responsible for synthesizing images of the object from views in addition to the target view. These additional views are different from the target view as well as the input views. The target view image and the additional view images are generated in the same pass of neural network system 244. In this way, the additional view images that are generated provide additional information regarding the shape of the depicted object during the training process for the target view. Synthesizing multiple novel views within the same pass during training of neural network system 244 enables high-quality reconstruction of complex shapes, such as asymmetric shapes with fined-grained details as are common in human subjects.

Additional view generator 224 synthesizes the additional view images in a similar manner as the target view utilizing neural network system 244. For example, in exemplary embodiments, a volumetric intermediate representation of the object is generated, and the additional views are generated from the volumetric intermediate representation. In some embodiments, an additional view image is created from a volumetric intermediate representation for an additional view angle that is created by resampling the volumetric intermediate representation of the target view angle such that the volumetric representation for the target view angle is utilized for generating the additional view images. Additionally, similar to target view generator 222, additional view generator outputs an RGB image of the additional view and, in some embodiments, a corresponding occlusion mask.

In exemplary embodiments, additional view generator 224 creates at least one adjacent view image from an adjacent view angle and one distant view image from a distant view angle that is farther from the target view than the adjacent view angle. Further, in some embodiments, the additional view images includes two adjacent view images and two distant view images. The viewing angles of the two adjacent view images may be equidistant from the target view, while the viewing angles of the two distant view images may be equidistant from the viewing angle. For example, if $I_t'$ represents the target view image that is generated, the adjacent view images may be represented as $I_{t+a}'$ and $I_{t-a}'$, and two distant view images may be represented as $I_{t+d}'$ and $I_{t-d}'$, where d is greater than a. In some embodiments, adjacent view angles are the immediately adjacent the target view angle, and the distant view angles are a predetermined minimum distance, such as 80 degrees, from the target view angle. For example, if the training data set has images with viewing angles at 20 degree increments starting at 0 and the target view angle is 120 degrees, the two adjacent view angles may be at 100 degrees and 140 degrees and the two distant view angles may be at 40 degrees and 200 degrees.

Rotated view generator 226 is generally responsible for creating rotated view images by warping images from one view to another view. The image being rotated is a ground truth image. The rotated view angle of the rotated view image matches the view a synthesized image (i.e., target view angle or additional view angle). In some embodiments, the initial view of the warped image, which is the view of the ground truth image prior to warping, may match the view of another synthesized image. In other words, rotated view generator 226 may warp a ground truth image matching the target view angle to an additional view angle or vice versa. In exemplary embodiments, rotated view generator 226 creates two rotated view images for each pair of target and additional view angles. For example, if the target view image is synthesized for 45 degrees and two additional view images are synthesized for 30 degrees and 60 degrees, rotated view generator 226 creates six rotated view images from ground truth images: $I_{45 \to 30}$, $I_{45 \to 60}$, $I_{30 \to 45}$, $I_{30 \to 60}$, $I_{60 \to 45}$, and $I_{60 \to 30}$. In other embodiments, a rotated view image is created only for pairs that include the target view angle such that the rotated view angle and the initial view angle do not both match additional view angles.

Rotated view generator 226 warps ground truth images using a warping function computed from a backward flow between the rotated view ground truth image and the initial view ground truth image. For example, where the rotated view angle is l and the initial view angle is l−1, the warping function $W_{l \to l-1}$ is computed from $F_{l \to l-1}$ between ground truth images $I_l$ and $I_{l-1}$. After the warping function is computed, a warping occlusion mask is computed between the rotated view ground truth image (e.g., $I_l$), and the initial view ground truth image (e.g., $W_{l \to l-1}(I_{l-1})$). In exemplary embodiments, the occlusion mask is computed as:

$$M_{l \to l-1} = e^{-\alpha \| I_l - W_{l \to l-1}(I_{l-1}) \|_2^2}$$

where α=50 with pixel range between [0,1]. The warping occlusion mask indicates which pixels from the ground truth image of the initial view are present in the rotated view image. For example, where a pixel from the initial view ground truth image is present in the rotated view image, the mask value for the pixel is 1, and where the pixel of the initial view image is not present in the rotated view image, the mask value is 0.

Rotated view generator 226 applies the occlusion mask to the rotated view image (i.e., the warped ground truth image) (e.g., $W_{l \to l-1}(I_{l-1})$) and the image generated by the neural network system 244 that matches the rotated view (e.g., $I_l'$), which may be either the target view image or an additional view image. The results of this application of the mask to these images may be referred to as $Y_{l \to l-1}$ and $Y_l'$ and are used to provide information on the quality of the rotational consistency during training neural network system 244. In some embodiments, warping functions and/or warping occlusion masks are computed as described during training at some point after synthesis of the target view image. In other embodiments, the warping function and/or the warping occlusion masks are computed and stored prior to training, and rotated view generator 226 accesses the stored information to apply them.

Loss determiner 228 of training component 220 is generally responsible for computing errors in output of neural network system 244 using one or more loss functions. These errors are fed back into neural network system 244 so that the neural network is adjusted to reduce errors in future iterations. Loss determiner 228 computes a base loss to determine error based only on the generated target view image. In embodiments in which multiple additional views are generated in the same pass of the neural network system 244, loss determiner 228 also determines a multi-view supervision loss. In embodiments in which rotated views are generated, loss determiner 228 computes a rotational loss in addition to the base loss. Further, in some embodiments, loss determiner 228 computes a base loss, a multi-view supervision loss, and a rotational loss. These losses are computed based a single pass through neural network system 244. As such, embodiments of this disclosure include training neural network system 244 to synthesize novel views utilizing two or three types of losses with each pass.

Loss determiner 228 determines the base loss as a measure of error of the target view image generated by target view generator 222. Loss determiner 228 computes the base loss utilizing one or more base loss functions, which depend on the type of neural network system 244. In exemplary embodiments, neural network system 244 has a CNN architecture and the base loss functions include a pixel-wise $L_1$ reconstruction loss between ground truth image and synthesized image, which is denoted as $\mathcal{L}_R$, and an $L_2$ perceptual loss in the feature space of the VGG-19 network, which is denoted as $\mathcal{L}_P$. These losses are computed with the following equations:

$$\mathcal{L}_R = \| I_t - I_t' \|_1 \tag{1}$$

$$\mathcal{L}_P = \sum_i \| VGG_i(I_t') - VGG_i(I_t) \|_2^2 \tag{2}$$

where $VGG_i$ indicates output of the $i^{th}$ layer of the VGG-19 network. Additionally, the base loss functions may include a structural similarly loss denoted as $\mathcal{L}_S$ and an adversarial loss denoted as $\mathcal{L}_A$.

In some embodiments, loss determiner 228 determines a multi-view supervision loss that measures error using the additional view images generated by additional view generator 224. Loss determiner 228 computes the multi-view supervision loss utilizing one or more multi-view supervision loss functions. Embodiments of the multi-view supervision loss functions are similar to the base loss functions but focus on the additional view images that are synthesized. As such, in exemplary embodiments, the multi-view loss functions include a pixel-wise $L_1$ reconstruction loss between ground truth image and synthesized additional view image, which is denoted as $\mathcal{L}_R$, an $L_2$ perceptual loss in the feature space of the VGG-19 network, which is denoted as $\mathcal{L}_P$, a structural similarly loss denoted as $\mathcal{L}_S$, and an adversarial loss denoted as $\mathcal{L}_A$. In exemplary embodiments, loss determiner 228 computes the multi-view supervision loss with the following equations:

$$V_l = S\{V_t, T_{t \Rightarrow l}\} \tag{1}$$

-continued $$I'_l = D\{V_l\} \quad (2)$$

$$\mathcal{L}_R = \|I'_l - I_l\|_1 \quad (3)$$

$$\mathcal{L}_P = \sum_i \|VGG_i(I'_l) - VGG_i(I_l)\|_2^2 \quad (4)$$

$$\mathcal{L}_{Multi} = \frac{1}{|L_a| + |L_f|} \sum_{l \in \{L_a, L_f\}} (\lambda_R \mathcal{L}_R + \lambda_P \mathcal{L}_P + \lambda_S \mathcal{L}_S + \lambda_A \mathcal{L}_A) \quad (5)$$

where volumetric representation $V_l$ is resampled from $V_t$, $l \in \{L_a, L_f\}$, $I'_l$ is the synthesized additional view image, and $I_l$ is the ground truth image corresponding to the additional view angle. This multi-view supervision loss provides additional information on the global shape of the object, such as a human subject, to improve accuracy in depicting the object in the target view image. As such, training neural network system to reduce multi-view supervision loss enables high-quality reconstruction of complex shapes, such as asymmetric shapes with fined-grained details, with spatial consistency.

In some embodiments, loss determiner 228 determines a rotational loss that measures error in rotational consistency across different views based on rotated views generated by rotated view generator 226. Error computed by comparing a synthesized image with a ground truth image warped to the view of the synthesized image provides additional information regarding spatial properties across different views, which trains neural network system 244 to provide spatially consistent construction of objects across different views. As such, multiple novel views of an object synthesized using the trained neural network system 244 may be combined with a seamless transition between the views.

As described with respect to rotated view generator 226, the occlusion mask $M_{l \Rightarrow l-1}$ is applied to both the generated image $I'_l$ and the rotated view image $W_{l \Rightarrow l-1}$ $(I_{l-1})$ as indicated by the following:

$$Y'_l = M_{l \Rightarrow l-1} \cdot I'_1 \quad (1)$$

$$Y_{l \Rightarrow l-1} = M_{l \Rightarrow l-1} \cdot W_{l \Rightarrow l-1}(I_{l-1}) \quad (2)$$

Applying the occlusion masks to these images allows loss to be determined only for pixels that are visible given the backward flow between the initial view and the rotated view. As such, based on products $Y'_l$ and $Y^{l \Rightarrow l-1}$, loss determiner 228 computes the rotational loss utilizing one or more rotational loss functions. In exemplary embodiments, the rotational loss functions include $\mathcal{L}_{R_1}$ and $\mathcal{L}_{R_2}$ representing $L_1$ reconstruction loss and the structural similarity loss (SSIM is considered normalized), respectively, between the rotated view image (i.e., the warped ground truth image) and the neural network-synthesized image corresponding to the rotated view angle. In exemplary embodiments, loss determiner 228 computes the rotational loss with the following equations:

$$\mathcal{L}_{R_1} = \|Y'_l - Y_{l \Rightarrow l-1}\|_1 + \|Y'_{l-1} - Y_{l \Rightarrow l-1}\|_1 \quad (1)$$

$$\mathcal{L}_{R_2} = [1 - SSIM(Y'_l, Y_{l \Rightarrow l-1})] \quad (2)$$

$$\mathcal{L}_{Rot} = \frac{1}{|L_a|} \sum_{(l-1,l) \in \{L_a \cup \{t\}\}} (\lambda_{R_1} \mathcal{L}_{R_1} + \lambda_{R_2} \mathcal{L}_{R_2}) \quad (3)$$

Loss determiner 228 determines an overall loss for each pass through neural network system 244 during training by combining the base loss with the multi-view supervision loss, the rotational loss, or both the multi-view supervision loss and the rotational loss. In an exemplary embodiment, all three types of losses are combined to determine the total loss according to the following equation:

$$\mathcal{L}_{Total} = \lambda_{Base} \mathcal{L}_{Base} + \lambda_{Multi} \mathcal{L}_{Multi} + \lambda_{Rot} \mathcal{L}_{Rot}$$

The weights $\lambda_{Base}$, $\lambda_{Multi}$, and $\lambda_{Rot}$ may be adjusted during training of neural network system 244. In one embodiment, the weights are all set to one.

In execution, neural network system 244, trained according to the present disclosure, is used to synthesize novel views of an object from a set of input views. Such novel view synthesis is performed by novel view synthesizing engine 230 utilizing neural network system 244. The method of novel view synthesis is similar to the process described for training neural network system 244 in that, in exemplary embodiments, a volumetric representation of the object is extracted from a set of input images, and the volumetric representation is utilized to generated an RGB image for a target view; however, in execution, the generated target view images are typically not associated with existing ground truth images. In some embodiments, novel view synthesizing engine 230 also creates an occlusion mask corresponding to the target view angle.

Input images used by novel view synthesizing engine 230 may include a predetermined number of images. In some embodiments, the number of input images with known views of the same object is two. In other embodiments, the number of input images is three. In yet other embodiments, the number of input images is four. In exemplary embodiments, the input images are received by novel view synthesizing engine 230 from a user at a user device. In particular, a user can select or input one or more images or picture of an object, such as a human, from different views. Such an image can include a picture taken by a user using a computing device such as those described with reference to FIG. 10. An image and/or picture can be selected or input in any manner. For example, a user may take a picture using a camera on a device, for example, user device 102a of FIG. 1. As another example, a user may select a desired image from storage, such as database 112, accessible by a network or stored locally at the user device 102a of FIG. 1. In other aspects, a user inputs an image by inputting a link or URL to an image. In some embodiments, after the neural network system 244 generates a target view image depicting the object of input images at the target view angle, the target view image is displayed via a display screen of a user device, such as user device 102a.

Figure 3:
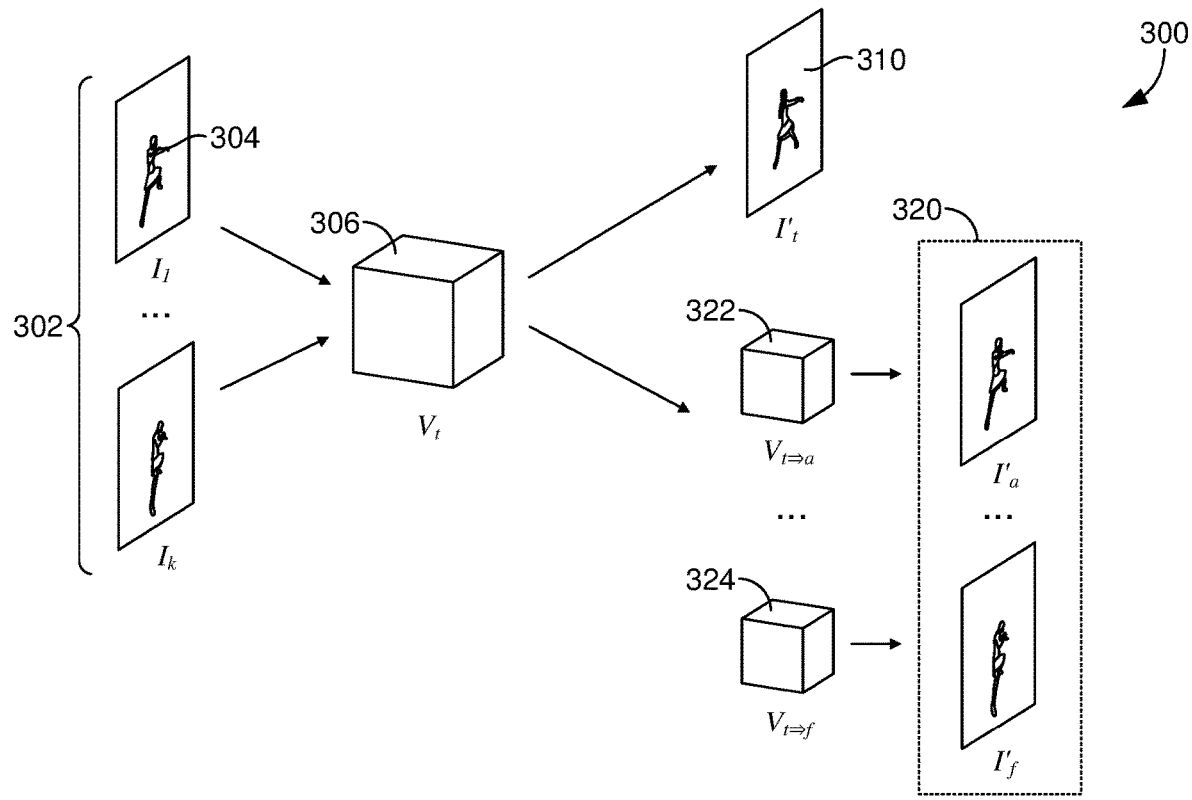
FIG. 3 illustrates a process flow showing an example embodiment for training a novel view synthesis system utilizing multi-view supervision, in accordance with embodiments of the present invention.

Turning to FIG. 3, an example process 300 of multi-view supervision is depicted. Process 300 may be performed by an embodiment of target view generator 222 and additional view generator 224 FIG. 2. In example process 300, a set of input images 302 are input into a neural network system, such as neural network system 244, to generate an intermediate volumetric representation of the object (human 304) depicted in each input image. Each input image depicts human 304 at a different viewing angle. In this example, at least two input images 302 (denoted as $I_l$ to $I_k$) are depicted with each input image 302 depicting a different view angle of human 304; however, it is contemplated that, in some embodiments, three or four input images may be utilized.

From the set of input images 302, an intermediate volumetric representation 306 (denoted as $V_t$) of human 304 is generated. From the intermediate volumetric representation 306, a target view image 310 is synthesized. The target view image 310, denoted as $I_t'$, depicts a view of human 304 that is not present in the input images 302. In exemplary embodiment, target view image 310 is generated by target view generator 222 of FIG. 2.

In addition to the target view image 310, additional view images 320 are also generated from the input images. Additional view images 320 include at least one adjacent view image from an adjacent view angle ($I_a'$) and one distant view image from a distant view angle ($I_f'$) that is farther from the target view angle than the adjacent view angle. In exemplary embodiments, additional view images 320 includes two adjacent view images and two distant view images. In exemplary embodiments, each additional view image is generated by resampling the intermediate volumetric representation 306 for the target view to a volumetric representation for the additional view. FIG. 3, for instance, depicts volumetric representation 322 ($V_{t \to a}$) and volumetric representation 324 ($V_{t \to f}$) that are resampled from volumetric representation 306 of the target view.

Each additional view image 320 is compared to a ground truth image labeled with the additional view angle (which may be referred to as a ground truth additional view image) to determine an error. In exemplary embodiments, this error, which is referred to as multi-view supervision loss, is computed by loss determiner 228 of FIG. 2, and is combined with a base loss measuring an error between the target view image 310 and a ground truth image labeled with the target view angle (which may be referred to as a ground truth target view image). The total loss for the set of input images 302 in generating target view image 310 may be utilized to adjust weights of the neural network system to reduce the error, and this process continues until an allowable error rate threshold is satisfied. A neural network trained in accordance with process 300 may be utilized to synthesize new target view images of objects, including human subjects, based on other sets of input images.

Figure 4:
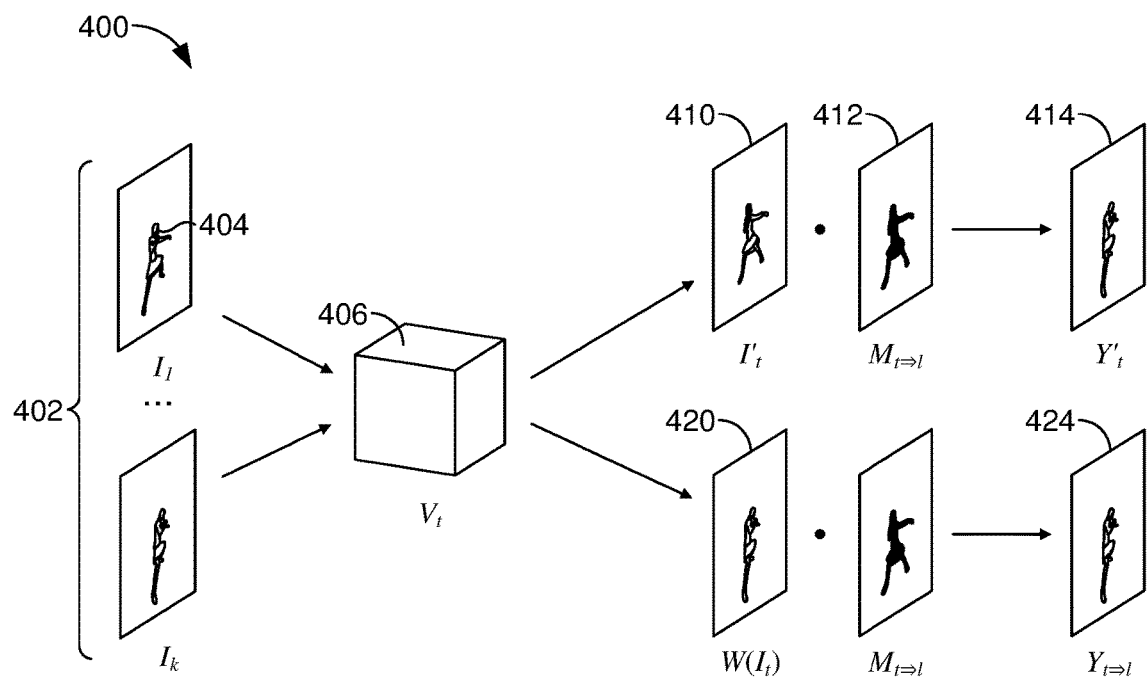
FIG. 4 illustrates a process flow showing an example embodiment for training a novel view synthesis system utilizing rotational loss, in accordance with embodiments of the present disclosure.

Turning to FIG. 4, an example process 400 of training a novel view synthesis system utilizing rotational consistency is depicted. Process 400 may be performed by an embodiment of target view generator 222 and rotated view generator 226 of FIG. 2. In example process 400, a set of input images 402 are input into a neural network system, such as neural network system 244, to generate an intermediate volumetric representation of the object (human subject 404) depicted in each input image. Each input image depicts human subject 404 at a different viewing angle. In this example, at least two input images 402 (denoted as $I_l$ to $I_k$) are depicted, with each input image 402 having a different view of human subject 404; however, it is contemplated that, in some embodiments, three or four input images may be utilized.

From the set of input images 402, an intermediate volumetric representation 406 (denoted as $V_t$) of human subject 404 is generated. From the intermediate volumetric representation 406, a target view image 410 is synthesized similar to synthesis of target view image 310 explained in conjunction with FIG. 3. The target view image 410, denoted as $I_t'$, depicts a view of human subject 404 that is not present in the input images 402. In exemplary embodiments, target view image 410 is generated by target view generator 222 of FIG. 2.

In addition to the target view image 410, a rotated view image 420 is generated by warping a ground truth image from an initial angle to a rotated view angle, which may be performed by an embodiment of rotated view generator 226 of FIG. 2. In exemplary embodiments, the rotated view angle corresponds to either the target view angle or, in embodiments utilizing multi-view supervision, an additional view angle. In process 400 of FIG. 4, the rotated view is the target view, and the initial view is 1 such that, process 400 includes warping ground truth image $I_l$ to $I_t$. The rotated view image 420, which may also be referred to as a warped ground truth image, is created utilizing a warping function computed from the ground-truth backward flow. In FIG. 4, rotated view image 420 is denoted as $W(I_t)$, but it may also be referred to according to the initial view, such as $W_{t \Rightarrow l}(I_l)$. Additionally a warping occlusion mask 412 is generated and denoted as $M_{t \Rightarrow l}$. The warping occlusion mask 412 indicates which pixels from the initial view image ($I_l$) are present in the rotated view image 420 ($W(I_t)$) and which pixels are not present. The warping occlusion mask 412 is applied to the rotated view image 420 to yield product 424 ($Y_{t \Rightarrow l}$) and applied to the generated target view image 410 to yield product 414 ($Y_t'$). These products are compared to determine an error. In exemplary embodiments, this error, which is referred to as rotational loss, is computed by loss determiner 228 of FIG. 2, and is combined at least with a base loss measuring an error between the target view image 410 and the ground truth target view image. In some embodiments, process 400 includes synthesizing one or more additional view images as described with respect to process 300. In addition to computing a multi-view supervision loss based on the additional view images, the additional view images may also be utilized to determine rotational loss as described further with respect to rotated view generator 226 of FIG. 2.

The total loss for the set of input images 402 in generating target view image 410 may be the rotated loss combined with the base loss and, in some embodiments, further combined with a multi-view supervision loss. This total loss is utilized to adjust weights of the neural network system to reduce the error, and this process continues until a maximum allowable error rate is satisfied. A neural network trained in accordance with process 400 may be utilized to synthesize new target view images of objects, including human subjects, based on other sets of input images.

Turning to FIG. 5, an example network architecture 500 for a neural network trained utilizing both multi-view supervision and rotational consistency is depicted. Network architecture 500 utilizes a base architecture that may be referred to as a Transformable Bottleneck Network (TBN). As depicted, the base architecture is generally formed of three blocks: an encoder network 504, a resampling layer 505, and a decoder network 508. Encoder network 504 takes input images 502 ($I_1$ to $I_k$) in the form of RGB images as input and generates a volumetric intermediate representations $V_1$ to $V_k$ through a series of 2D convolutions, reshaping, and 3D convolutions.

Embodiments of bottleneck resampling layer 505 transforms an input volumetric representation (e.g., $V_k$) into a volumetric representation for a target view via trilinear interpolation $T_{k \to t}$ (where k and t are the input and target views, respectively). Where there are multiple input views, such as depicted in FIG. 5, the input volumetric representations can be used to create an aggregated volumetric representation 506 by averaging the intermediate volumetric representations.

Decoder network 508 has an architecture that general mirrors encoder network 504 such that it performs a series of 3D convolutions, reshaping, and 2D convolutions. Aggregated volumetric representation 506 is input into decoder network 508 to generate the target view image 510 ($I_t'$). As illustrated, some embodiments of decoder network 508 include two branches. A first branch generates RGB image of the target view, referred to as the target view image 510, and the second branch generates an occlusion mask 514 that indicates which pixels of the target view image are background pixels and which pixels are foreground pixels, which represent the object, such as a human. By comparing the generated target view image 510 to a ground truth image 512 corresponding to the target view angle and, in some embodiments, comparing the occlusion mask 514 of the generated target view with a ground truth occlusion mask 516 for the target view, a base loss is be computed.

In addition to generating the target view image 510, an additional view image 520 is generated from aggregated volumetric representation 506. Specifically, aggregated volumetric representation 506 for the target view is resampled to a volumetric representation for the additional view. Decoder network 508 decodes the volumetric representation of the additional view into the additional view image 520, which is compared to the ground truth additional view image 522 (e.g., $I_l$) to compute a multi-view supervision loss.

Additionally, one or more rotated view images are created by warping a ground truth image from an initial view angle to a rotated view angle that matches the view of a synthesized image, such as the target view angle or an additional view angle. In FIG. 5, ground truth image of initial view l−1 is warped to an additional view l by estimating a backward flow from l to l−1 to compute a warping function, resulting in rotated view image 530. A warping occlusion mask 532 is also generated and applied to both the rotated view image 530 to yield $Y_{l \rightarrow l-1}$ and to the additional view image 524, which has a view angle matching the rotated view angle, to yield $Y_l'$. These products are compared to one another to determine an error. In exemplary embodiments, this error, which is referred to as rotational loss, is computed by loss determiner 228 of FIG. 2, and is combined with the base loss and the multi-view supervision loss.

Figure 6:
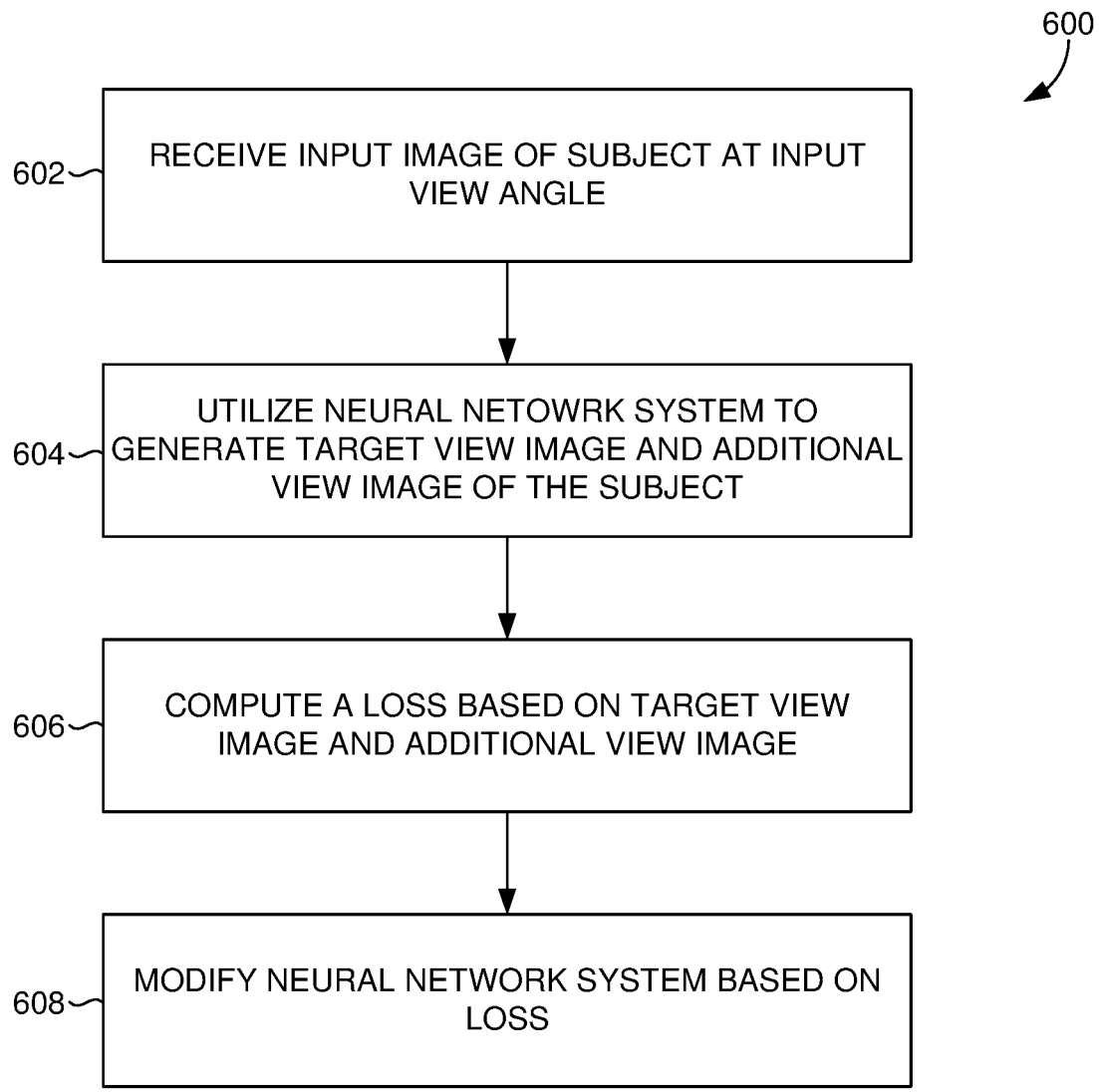
FIG. 6 illustrates an example method for training a novel view synthesis system utilizing multi-view supervision, in accordance with embodiments of the present disclosure.

With reference to FIG. 6, a flow diagram is provided to show an embodiment of a method 600 for training a neural network for novel view synthesis, in accordance with embodiments of the present invention. Method 600 may be performed, for example, by training component 220 of novel view synthesizer 200 in FIG. 2. Further, embodiments of method 600 may be performed in accordance with process 300 of FIG. 3. Method 600 and other methods disclosed herein, such as methods 700, 800, and 900, each include steps that correspond to different functions performed by the same or different hardware components on one computing device, which may be a user device or a remote server. Additionally or alternatively, some or all of these steps in these methods may be performed on hardware components of different computing devices such that these methods may be performed in a distributed fashion.

At block 602, an input image of an object is received. The input image depicts the object at an input view angle. In exemplary embodiments, the object of the input image is a human having an asymmetric shape. Block 602 may be performed by an embodiment of training component 220 of FIG. 2. In exemplary embodiments, a set of input images are received at block 602. Each input image in the set depicts the same object but at different views, which may vary with respect to azimuth and/or elevation. In some embodiments, only two input images are utilized. In other embodiments, three input images are utilized. In further embodiments, four input images are utilized. It is contemplated that the number of input images may be more (e.g., five or more) or less (e.g., one) in other embodiments.

In some embodiments, the input image is received from input from a user device. For example, a user may select an input image or set of input images of the same object from a repository, such as training data 242 in data store 240 of FIG. 2, accessible by a network or stored locally on the user device. In some aspects, rather than selecting a particular input image or set of input images for the same object, a user may select a library of input images that are sequentially run through neural network system in accordance with method 600.

At block 604, a neural network system is utilized to generate a target view image and at least one additional view image. Exemplary embodiments of block 604 are performed by target view generator 222 and additional view generator 224. Specifically, target view generator 222 generates the target view image while additional view generator 224 generates the additional view image(s). The target view image depicts the object at a target view angle, and the additional view image depicts the object at an additional view angle. Both the target view angle and the additional view angle are different than the input view angle. In exemplary embodiments, block 604 includes generating multiple additional view images each having a different additional view angle. In one embodiment, block 604 includes generating at least one adjacent view image from an adjacent view angle and one distant view image from a distant view angle that is farther from the target view angle than the adjacent view angle. In one example embodiment, two adjacent view images and two distant view images are generated.

The target view image and additional view image(s) are created from the input image utilizing a neural network system. In some embodiments, the neural network system includes a convolutional neural network or, in one example, a TBN structure, such as the network shown in FIG. 5. From the input image, an intermediate volumetric representation is created for the target view image. Where there are multiple input view images, a volumetric representation is created from each input image, and an aggregated intermediate volumetric representation is created for the target view image. Further, in exemplary embodiments, the volumetric representation for the target view image is resampled to a representation for each additional view image. From the respective volumetric representations, the target view and additional view images are created. In exemplary embodiments, the target view image and additional view image(s) created at block 604 are RGB images. In some embodiments, occlusion masks indicating background and foreground pixels for the target view and additional view images are also generated at block 604.

At block 606, a loss is computed based on the target view image and the additional view image. Embodiments of block 606 are performed by loss determiner 228 of FIG. 2. The loss is a measure of error between output of the neural network system, which includes the target view image and at least one additional view image. In exemplary embodiments, the loss is computed by computing a base loss, computing a multi-view supervision loss, and combining the two types of losses. The base loss is determined by comparing the target view image to a ground truth target view image, which is a ground truth image labeled with the target view angle. The multi-view supervision loss is determined by comparing each additional view image to a ground truth image at the corresponding additional view angle. In exemplary embodiments, the base loss and the multi-view supervision loss are combined by applying weights to the losses and summing the weighted losses. Some embodiments of method 600 include computing a rotational loss based on a rotated view image that is generated by warping a ground truth image as described further in method 700 of FIG. 7.

At block 608, the neural network system is modified based on the loss. This modification may include adjusting weights within the neural network system to reduce the loss in future iterations. In exemplary aspects, method 600 is repeated until the loss satisfies an allowable loss threshold.

Figure 7:
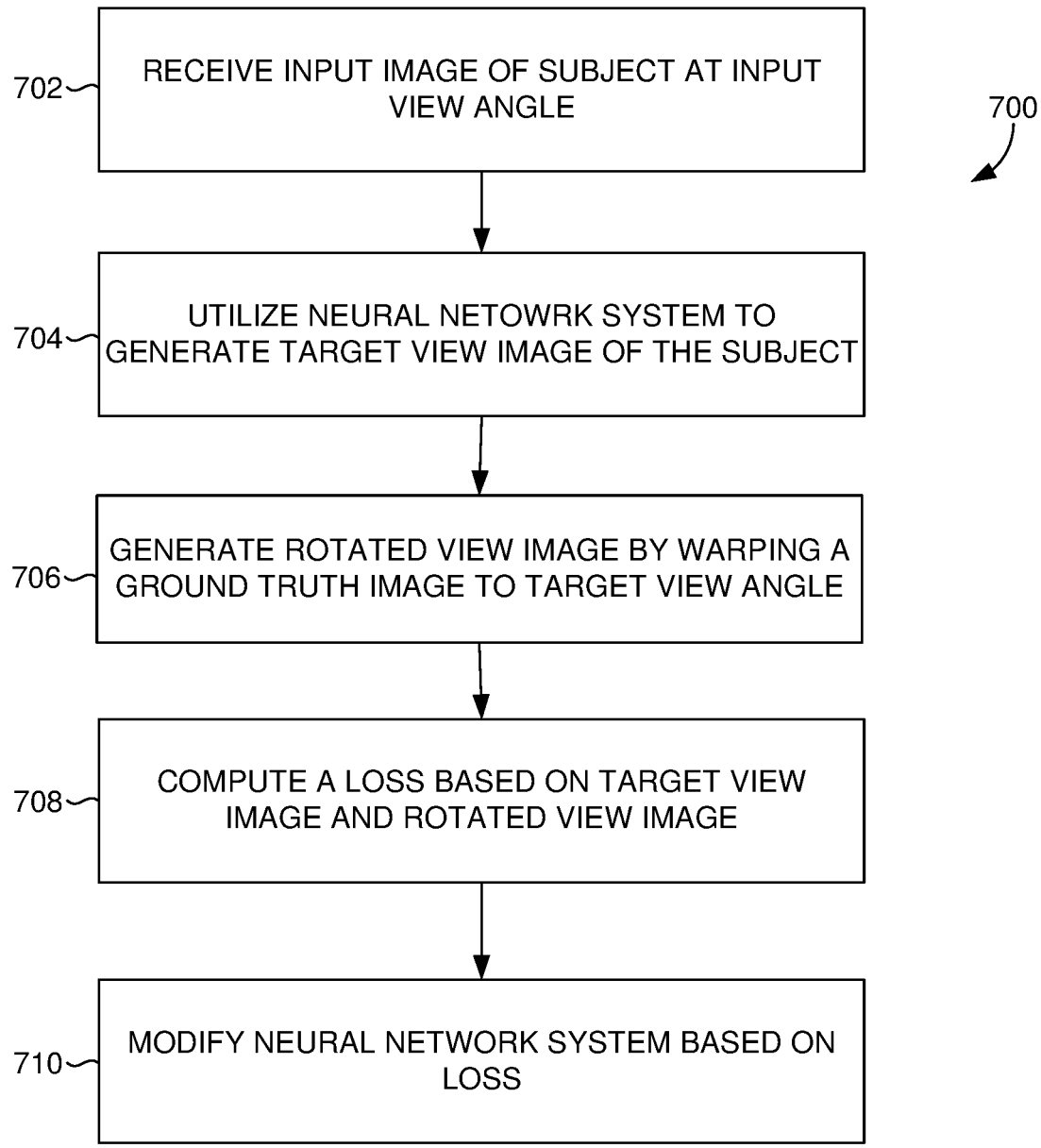
FIG. 7 illustrates an example method for training a novel view synthesis system utilizing rotational loss, in accordance with embodiments of the present disclosure.

FIG. 7 depicts example method 700 for training a neural network system to perform novel view synthesis with rotational consistency. At block 702, an input image of an object is received. The input image depicts the object at an input view angle, and in exemplary embodiments, the object of the input image is a human with asymmetric shape. Embodiments of block 702 are performed as described with respect to block 602 of FIG. 6. At block 704, a neural network system is utilized to generate a target view image of the object. Embodiments of block 704 are performed in a similar manner as described with respect to generating the target view image at block 604 of FIG. 6.

At block 706, a rotated view image is generated. Embodiments of block 706 are performed by rotated view generator 226 of FIG. 2. The rotated view image is generated by warping a ground truth image from an initial angle to a rotated view angle, where the rotated view angle matches the angle of a synthesized image, such as the target view image. In other words, in embodiments of block 706, the rotated view image is a ground truth image warped from an initial view angle to the target view angle. Some embodiments of block 706 include warping the ground truth image using a warping function that is computed from a backward flow between the ground truth image at the initial view and a ground truth image at the rotated view (i.e., target view).

At block 708, a loss is computed based on the target view image and the rotated view image. In exemplary embodiments, the loss includes a rotational loss computed from the target view image and the rotated view image. The rotational loss is also computed by applying an occlusion mask to these images. More specifically, exemplary embodiments of method 700 further include generating a warping occlusion mask that indicates which pixels from the ground truth image of the initial view are present in the rotated view. In such embodiments, the warping occlusion mask is applied to both the rotated view image and the target view image, which depicts the same view angle as the rotated view image. As such, the product of the mask and the rotated view image and the product of the mask and the target view image are compared to determine the rotational loss.

The loss computed at block 708 may also include a base loss that is generated by comparing the synthesized target view image with the ground truth target view image. In exemplary aspects, a total loss is determined by combining the base loss and the rotational loss, such as by summing a weighted base loss and a weighted rotational loss. At block 710, the neural network system is modified based on the determined loss in a similar manner as described at block 608 of FIG. 6.

Figure 8:
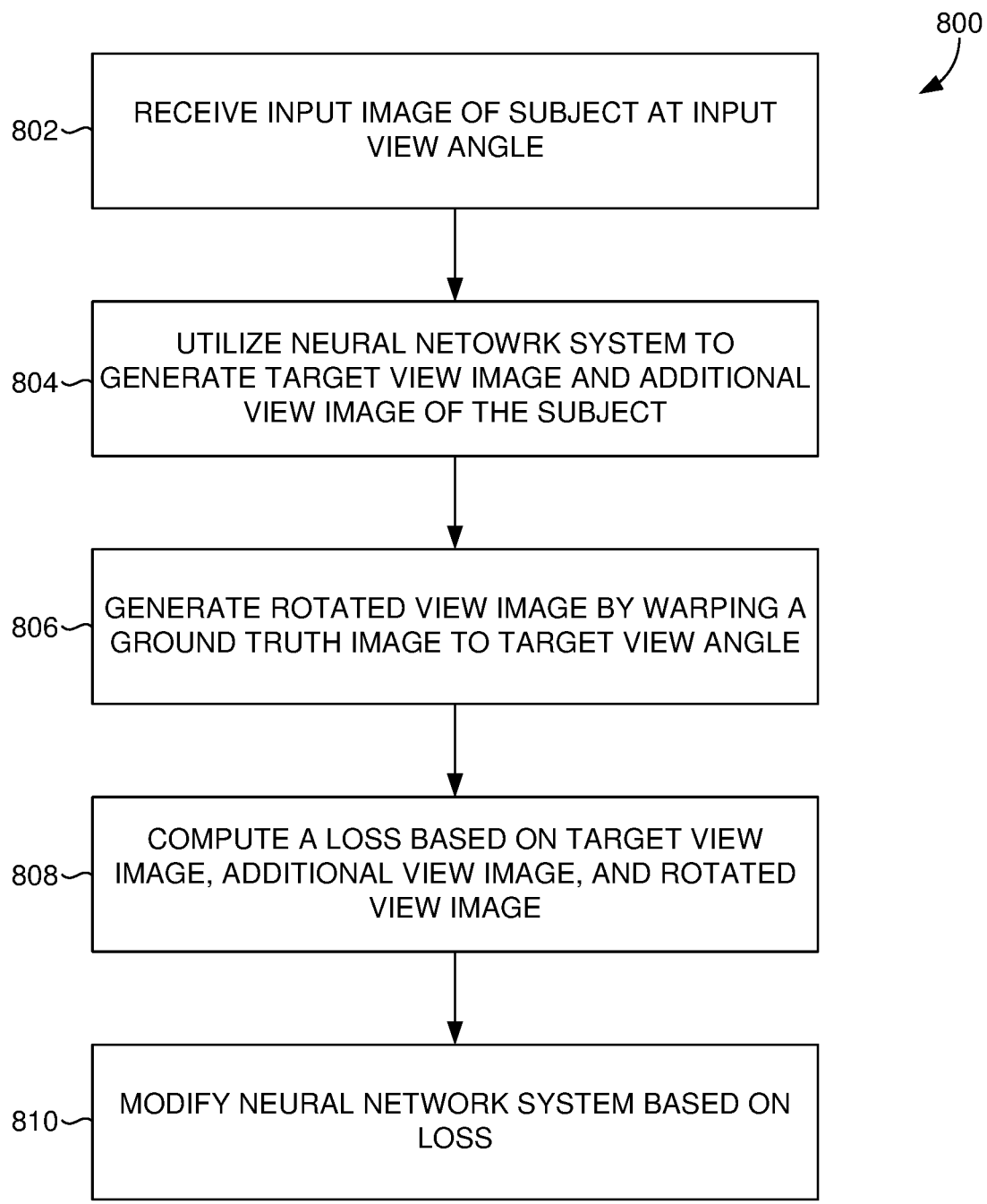
FIG. 8 illustrates an example method for training a novel view synthesis system utilizing multi-view supervision and rotational loss, in accordance with embodiments of the present disclosure.

FIG. 8 depicts an example method 800 for training a neural network system with multi-view supervision and rotational loss. At block 802, an input image of an object is received. The input image depicts the object, such as a human, at an input view angle. Embodiments of block 802 are performed by an embodiment of training component 220 of FIG. 2 and are performed as described with respect to block 602 of FIG. 6. At block 804, a neural network is utilized to generate a target view image and one or more additional view images of the object. Embodiments of block 804 are performed by target view generator 222 and additional view generator 224 and are performed as described with respect to block 604 of FIG. 6.

At block 806, a rotated view image is generated. The rotated view image is generated by warping a ground truth image at an initial view angle to a rotated view angle that matches the view angle of an image generated at block 804. For example, a ground truth image at an initial view angle may be warped so that it is rotated to the target view angle. Additionally or alternatively, the ground truth image at an initial angle may be warped so that it is rotated to an additional view angle. Further, in some embodiments, the initial view angle also matches a view angle of an image generated at block 804. In one example, the initial view angle is an additional view angle and the rotated view angle is the target view angle or vice versa. Block 806 may include generating multiple rotated view images. For example, a first rotated view image may be generated by warping a ground truth additional view image from the additional view angle to the target view angle, and a second rotated view image may be generated by warping a ground truth target view image from the target view angle to the additional view angle.

The warping of the ground truth image to generate the rotated view image may be performed as described with respect to block 706 of FIG. 7. Additionally, embodiments of block 806 may be performed by rotated view generator 226 of FIG. 2.

At block 808, a loss is computed based on the target view image, the one or more additional view images, and the rotated view image. Embodiments of block 808 are performed by loss determiner 228 of FIG. 2. In exemplary embodiments, the loss is computed by determining a base loss, determining a multi-view supervision loss, determining a rotational loss, and combining the three types of losses. The base loss and the multi-view supervision loss may be determined as described at block 606 of FIG. 6. The rotational loss may be determined as described in block 708 of FIG. 7. In exemplary embodiments, the base loss, the multi-view supervision loss, and the rotational loss are combined to create a total loss that comprises a weighted sum of the three losses. Based on the total loss, at block 810, the neural network system is modified, which may be done as described at block 608 of FIG. 6.

Figure 9:
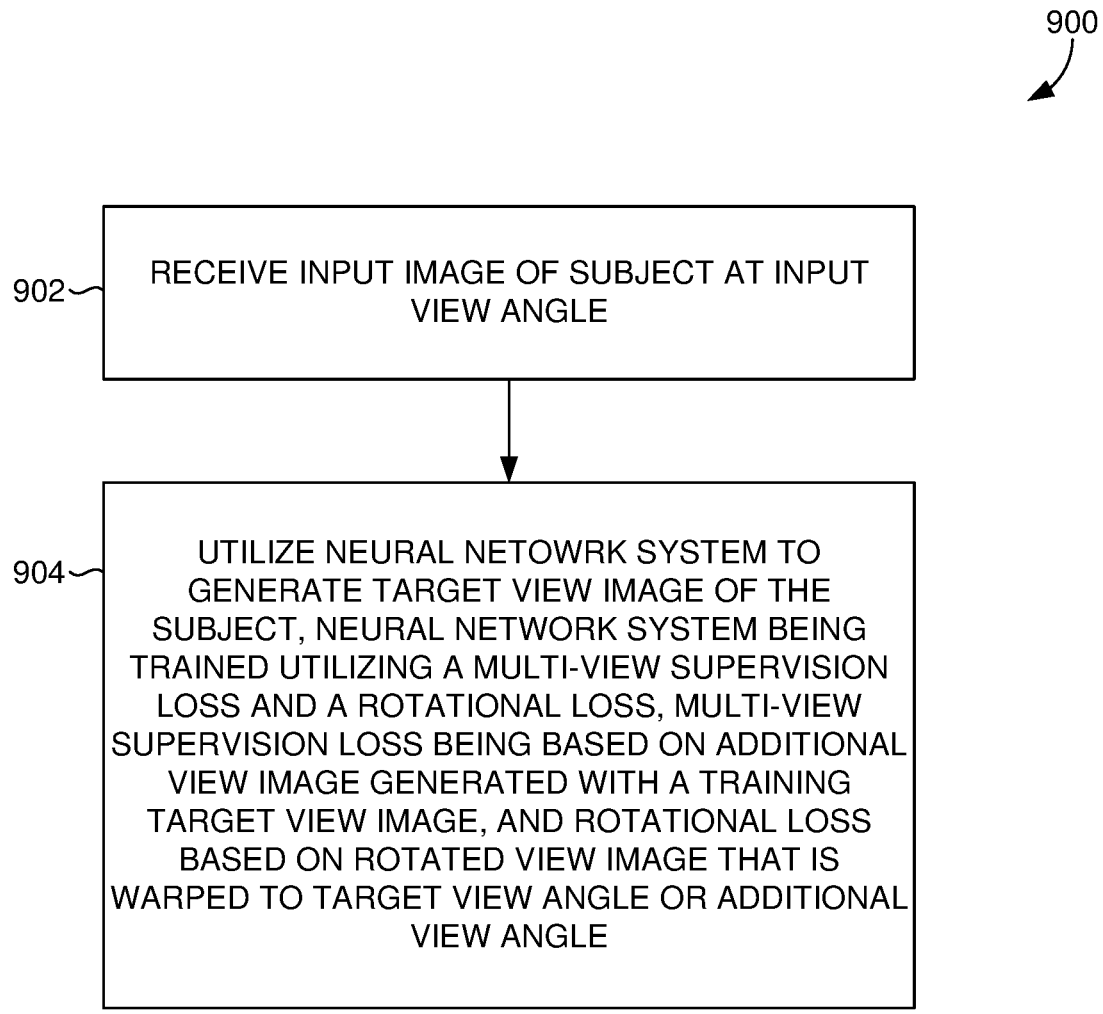
FIG. 9 illustrates an example method for novel view synthesis utilizing a trained system, in accordance with embodiments of the present disclosure.

FIG. 9 depicts an example method 900 for utilizing a trained neural network system to synthesis novel views. Embodiments of method 900 are performed by novel view synthesizing engine 230 of FIG. 2. At block 902, an input image of an object is received. The input image depicts the object, which may be a human subject, at an input view angle. In some aspects, the human subject depicted in the input image has an asymmetric shape. In exemplary embodiments, a set of input images are received at block 902. Each input image in the set depicts the same object but from different input view angles, which may vary with respect to azimuth and/or elevation. In some embodiments, only two input images are utilized. In other embodiments, three input images are utilized. In further embodiments, four input images are utilized. It is contemplated that the number of input images may be more (e.g., five or more) or less (e.g., one) in other embodiments.

The input image (or set of input images) may be received from a user device. In particular, a user can select or input an image or picture for the image. In some aspects, the image is input by a user taking a picture using a camera on a device, such as user device 102a of FIG. 1. In other aspects, the image is selected by a user from a repository, for example, stored in a data store, such as database 112, accessible by a network or stored locally at the user device. An image may also be received by a user inputting a link or URL to the image.

At block 904, a target view image is generated utilizing the neural network system. The target view image depicts the object of the input image but at a different, previously unknown viewing angle. The neural network utilized at block 904 is trained using a multi-view supervision loss and a rotational loss. The multi-view supervision loss is based on an additional view image that is generated during training during the same pass of the neural network system as a training target view image. This multi-view supervision loss may be computed as described in FIGS. 6 and 8. The rotational loss is based on a rotated view image that is a ground truth image warped to either a target view angle or an additional view angle. This rotational loss may be computed as described in FIGS. 7 and 8. Embodiments of method 900 may further include presenting the generated target view image to a user, via a graphical user interface, on a user device. Further, multiple target view images depicting the object at different unknown angles may be generated in accordance with method 900.

Figure 10:
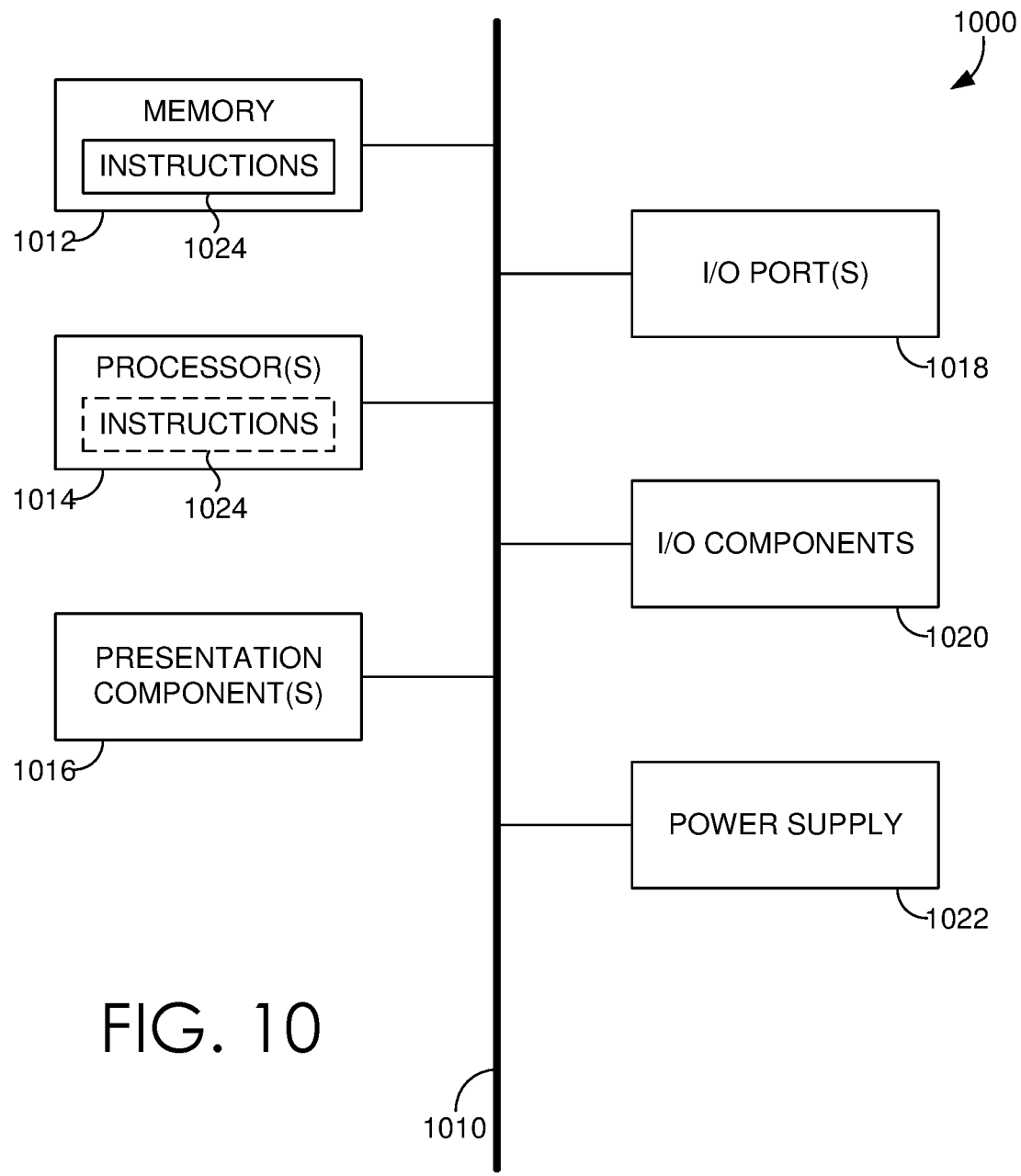
FIG. 10 is a block diagram of an example computing device in which embodiments of the present disclosure may be employed.

Having described embodiments of the present invention, FIG. 10 provides an example of a computing device in which embodiments of the present invention may be employed. Computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments of the present invention. Distinction is not made between such categories as "workstation," "server," "laptop," "handheld device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1000. Computing device 1000 may be equipped with depth cameras, such as stereoscopic camera systems, infrared camera systems, RGB camera systems, and combinations of these, for gesture detection and recognition. Additionally, computing device 1000 may be equipped with accelerometers or gyroscopes that enable detection of motion. The output of the accelerometers or gyroscopes may be provided to the display of computing device 1000 to render immersive augmented reality or virtual reality.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. A computer-implemented method for novel view synthesis, the method comprising:
   receiving an input image of an object captured at an input view angle;
   generating from the input image, utilizing a neural network system within a single pass of the neural network system, a target view image of the object at a target view angle and additional view images of the object at additional view angles, the additional view images comprising two adjacent view images at adjacent view angles of immediate angle increments;
   generating rotated view images by warping a ground truth target view image to depict the object at the additional view angles of the additional view images, the ground truth target view image different from the input image;
   computing a loss based at least on the target view image, the additional view images, and the rotated view images, computing the loss comprising:
     computing a base loss by comparing the target view image to the ground truth target view image, and
     computing a multi-view supervision loss by comparing each additional view image generated utilizing the neural network system to a ground truth additional view image corresponding to each of the additional views depicted in the additional view images;
     computing a rotational loss at least based on a comparison of the rotated view images and the additional view images comprising the two adjacent view images at the adjacent view angles; and
   modifying the neural network system based on the loss.

2. The computer-implemented method of claim 1, wherein receiving the input image of the object comprises receiving a plurality of input images of the object, each input image being of the object at a different input view angle relative to the other input images within the plurality of input images.

3. The computer-implemented method of claim 1, wherein the object is a human.

4. The computer-implemented method of claim 1, wherein the additional view images comprises a first additional view image from a first additional view angle and a second additional view image from a second additional view angle, wherein the absolute difference between the target view angle and the first additional view angle is different than the absolute difference between the target view angle and the second additional view angle.

5. The computer-implemented method of claim 1, wherein each of the target view image and the additional view images is an RGB image.

6. The computer-implemented method of claim 5, further comprising utilizing the neural network system to generate an occlusion mask at the target view angle.

7. The computer-implemented method of claim 1, wherein the additional view images further comprise two distant view images at angles farther from the target view angle than the adjacent view angles, wherein computing the loss further comprises:
   computing the rotational loss further based on a comparison of the rotated view images and the two distant view images.

8. One or more computer storage media having a plurality of executable instructions embodied thereon, which, when executed by one or more processors, cause the one or more processors to perform operations comprising:
   receiving an input image of an object captured at an input view angle;
   generating from the input image, utilizing a neural network system, a target view image of the object at a target view angle and additional view images of the object at additional view angles, the additional view images comprising two adjacent view images at adjacent view angles of immediate angle increments;
   generating rotated view images by warping a ground truth image at a first view angle to depict the object at the target view angle and the additional view angles, the ground truth image different from the input image;
   computing a loss based on at least the target view image and the rotated view images, computing the loss comprising:
     computing a base loss by comparing the target view image to a ground truth target view image depicting the object at the target view angle, and
     computing a rotational loss at least based on a comparison of the rotated view images and the additional view images generated from the input image; and
   modifying the neural network system based on the loss.

9. The one or more computer storage media of claim 8, wherein the operations further comprise generating a warping occlusion mask indicating which pixels in the ground truth image at the first view angle are visible in the rotated view images, wherein computing the loss comprises applying the warping occlusion mask to the rotated view images and to the target view image that is generated utilizing the neural network system.

10. The one or more computer storage media of claim 9, wherein the additional view images are generated within a same pass of the neural network system as the target view image.

11. The one or more computer storage media of claim 10, wherein the additional view angles of the additional view images comprise the first view angle.

12. The one or more computer storage media of claim 10, wherein computing the loss further comprises computing a multi-view supervision loss at least based on a comparison of each of the additional view images generated utilizing the neural network system to ground truth additional view images corresponding to the additional views depicted in the additional view images.

13. The one or more computer storage media of claim 8, wherein the additional view images further comprise two distant view images at angles farther from the target view angle than the adjacent view angles.

14. A computerized method for novel view synthesis, the computerized method comprising:
   receiving an input image of an object captured at an input view angle;
   generating from the input image, utilizing a neural network system, a target view image of the object at a target view angle and additional view images of the object at additional view angles, the additional view images comprising two adjacent view images at adjacent view angles of immediate angle increments;
   generating rotated view images by warping a ground truth additional view image to depict the object at the target view angle and the additional view angles, the ground truth additional view image different from the input image;

computing a loss based at least on the target view image, the additional view images, and the rotated view images, wherein computing the loss comprises:
 computing a base loss by comparing the target view image to a ground truth target view image depicting the object at the target view angle, and
 computing a rotational loss at least based on a comparison of the rotated view images and the additional view images generated from the input image; and
modifying the neural network system based on the loss.

15. The computerized method of claim 14, wherein computing the loss further comprises:
computing a multi-view supervision loss by comparing each additional view image generated utilizing the neural network system to a ground truth additional view image corresponding to the additional views depicted in the additional view images; and
combining the base loss, the multi-view supervision loss, and the rotational loss.

16. The computerized method of claim 14, wherein the additional view images comprises a first additional view image captured at a first additional view angle and a second additional view image captured at a second additional view angle, wherein the absolute difference between the target view angle and the first additional view angle is different than the absolute difference between the target view angle and the second additional view angle.

17. The computerized method of claim 14, wherein the neural network system comprises a convolutional neural network.

18. The computerized method of claim 14, wherein the object depicted in the input image is a human.

19. The computerized method of claim 14, wherein receiving the input image of the object comprises receiving a plurality of input images of the object, each input image being of the object at a different input view angle relative to the other input images within the plurality of input images.

20. The computerized method of claim 14, wherein the additional view images further comprise two distant view images at angles farther from the target view angle than the adjacent view angles.

\* \* \* \* \*